United States Patent [19]

Wiljanen et al.

[11] Patent Number: 4,860,168
[45] Date of Patent: Aug. 22, 1989

[54] DEVICE IN TELEPHONE EXCHANGES FOR RUNNING TELEPHONE CABLES FROM A FIXED HORIZONTAL CABLE RUN TO EQUIPMENT IN A RACK SHELF

[75] Inventors: Bo I. Wiljanen, Upplands Väsby; Jan-Erik Karlsson, Farsta, both of Sweden

[73] Assignee: Telefonaktiebolaget L M Ericsson, Stockholm, Sweden

[21] Appl. No.: 198,508

[22] Filed: May 25, 1988

[30] Foreign Application Priority Data

Jun. 30, 1987 [SE] Sweden .................. 8702709

[51] Int. Cl.$^4$ .............................. H02B 1/20
[52] U.S. Cl. ...................... 361/428; 174/69; 361/427; 361/429
[58] Field of Search ............ 361/391, 426–429; 174/69; 312/272, 273

[56] References Cited

U.S. PATENT DOCUMENTS 3,792,189  2/1974  Stengel et al. .................. 174/69
4,002,856  1/1977  Sedlacek et al. ................ 361/428

FOREIGN PATENT DOCUMENTS 375659  7/1972  Sweden .

Primary Examiner—A. D. Pellinen
Assistant Examiner—Gregory D. Thompson
Attorney, Agent, or Firm—Burns, Doane, Swecker & Mathis

[57] ABSTRACT

The invention relates to a cable channel A for telephone cables (7) in a telephone exchange (4). The cable channel is mounted to join up with a horizontal cable run (3) at a height (H) in the exchange. The cable run (3) can be placed at different heights (H) in different telephone exchanges, and for enabling the use of a single type of cable channel for the cable runs (3) at different heights (H), the cable channel in accordance with the invention is one such that it is adjustable in height and includes a first part (1), and a second part (2) movable in said first part so that the height of the channel can be varied and adjusted to the height (H) of the respective cable run (3). The telephone cables (7) are taken through the cable channel A to the telephony equipment in a shelf rack (5).

4 Claims, 2 Drawing Sheets

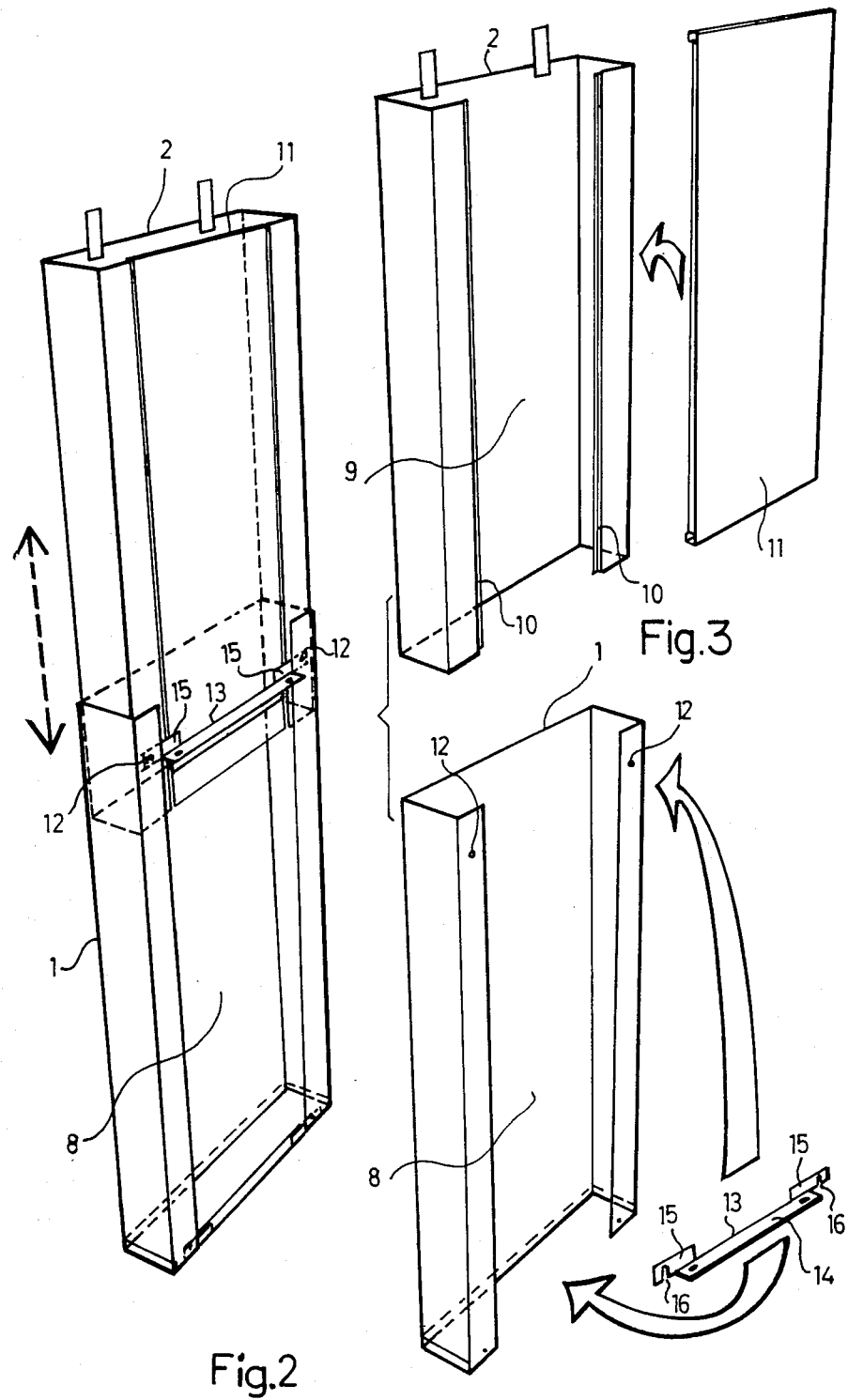

DEVICE IN TELEPHONE EXCHANGES FOR RUNNING TELEPHONE CABLES FROM A FIXED HORIZONTAL CABLE RUN TO EQUIPMENT IN A RACK SHELF

TECHNICAL FIELD

The invention relates to a cable channel for telephone cables in a telephone exchange.

BACKGROUND ART

In a telephone exchange, telephone cables in a fixed horizontal cable run are run through a vertical cable channel to the telephone equipment on rack shelves. The cable channels available today have a fixed height, depending on how high up the horizontal cable run is arranged.

DISCLOSURE OF INVENTION

Because cable channels in the state of the art have a fixed height, they must be especially manufactured so that the height of the cable channel corresponds to the height at which the fixed horizontal cable runs are placed in different telephone exchanges. These cable runs for example may be cable ladders or cable troughs. Special manufacture of the cable channels so that they obtain suitable height complicates manufacture and thereby increases the cost of production.

The device in accordance with the invention, which solves the above-mentioned problem, is characterized by the claims and comprises a height-regulatable cable channel including a first and a second part, the second part being movable in the first part so that the channel height can be varied and thereby adjusted to the height of fixed cable runs in any telephone exchange.

By a simple adjustment in height, a signal cable channel can accordingly join up to cable runs placed at different heights, i.e. the same type of cable channel can be utilized in different types of telephone exchanges. No special manufacture of the cable channel is thus required, which simplifies production and decreases the cost thereof.

BRIEF DESCRIPTION OF DRAWINGS

The arrangement in accordance with the invention will now be described in more detail with the aid of embodiment examples, and with reference to the accompanying drawing, where FIG. 2 is a perspective view of the inventive device, and FIG. 3 is an exploded view of the parts of the inventive device.

BEST MODE FOR CARRYING OUT THE INVENTION

Figure 1:
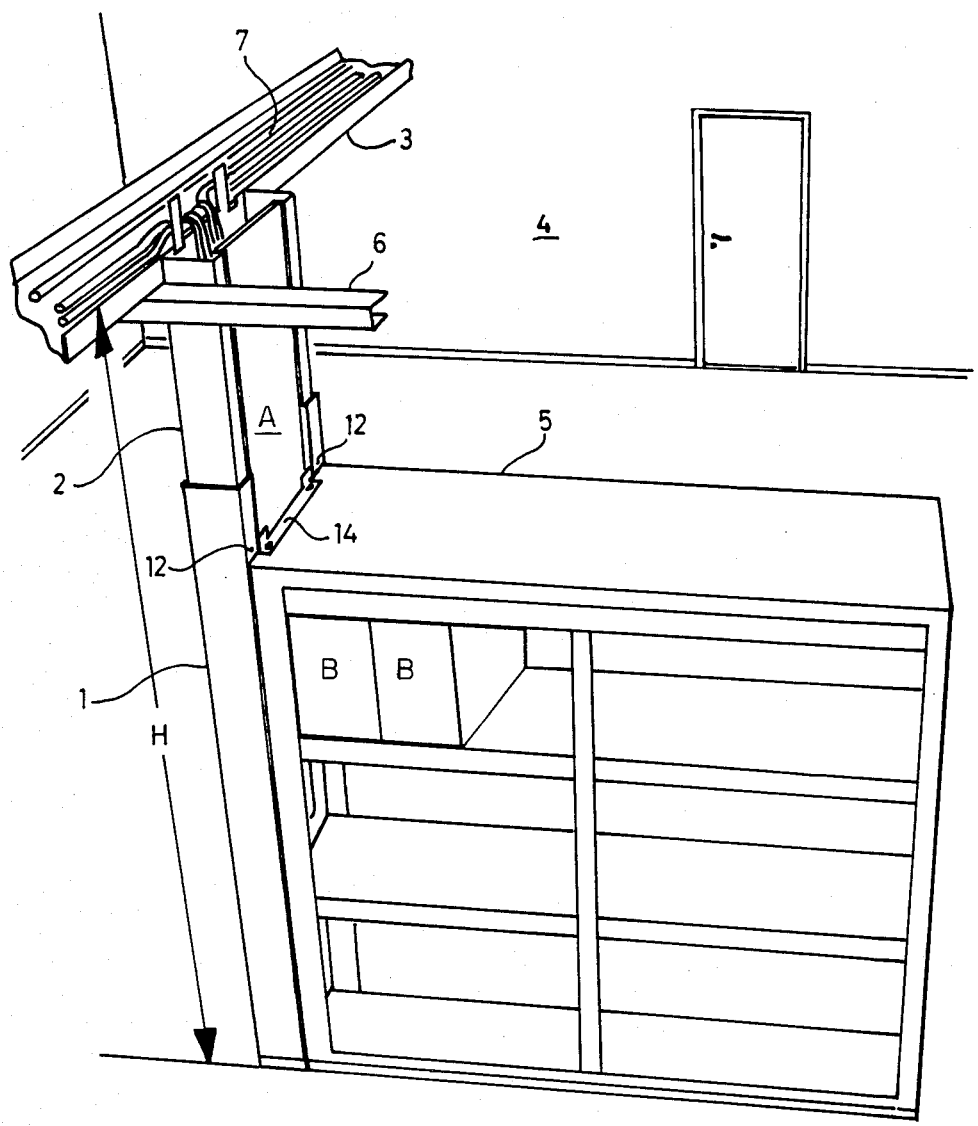
FIG. 1 illustrates the device in accordance with the invention erected between a cable run and a shelf rack in a telephone exchange.

As will be seen from FIG. 1, the embodiment example is a cable channel A in accordance with the invention. The channel is intended for erecting a fixed horizontal cable run 3 in a telephone exchange 4. In accordance with the embodiment the fixed cable run 3 is a U-shaped cable trough. FIG. 1 also illustrates the cable channel A erected between the cable trough 3 and a shelf rack 5 in the telephone exchange. Rails 6 fixed at a given height in the exchange carry the cable trough 3, which is thereby placed at a height H in the exchange. The trough leads telephone cables 7 to the cable channel A, and can be placed at different heights H in different telephone exchanges, as previously mentioned. To enable the use of a single type of cable channel with cable troughs placed at different heights, the cable channel in accordance with the invention is adjustable in height and includes a first part 1 and a second part 2 which is movable in the first part so that the height of the channel can be varied and adjusted to the height H at which the respective cable run or cable trough is placed. The height of the cable channel A is adjusted to the height H so that the second part 2 of the channel can be connected to the trough 3. The telephone cables 7 in the cable trough 3 are taken through the cable channel A to the telephony equipment B in the shelves of the rack. The cable channel is intended for a shelf rack 5 which is lower than the first part 1 of the channel.

FIG. 2 illustrates how the second part of the cable channel is displaceable in the first part 1, and FIG. 3 illustrates the parts of the device individually. The first part 1 of the channel has a rectangular cross-section and an opening 8 at the front long side connected to the rack. The cables are distributed to different shelves in the rack 5 via the opening 8. The second part 2 of the channel has a corresponding cross section such as to enable it to be moved in the first part. The second part also has an opening 9 corresponding to the opening in the first part. The long edge portions of the opening 9 have a joggled part 10 to provide a recess in the front long side of the second part of the channel, such that a cover 11 can be arranged to close the cable channel opening 8, 9. The upper short side of this cover 11 is folded over such as to enable it to be suspended on the upper edges of the joggles 10 when it is accomodated in the recess formed by the joggles 10. The length of the cover 11 is such that when the cable channel is adjusted to maximum height, it covers the part of the opening 8,9 which is situated above the rack. The first part 1 of the channel is somewhat higher than the rack 5 (see FIG. 1) resulting in that the two parts of the channel, after it has been adjusted to a suitable height, can be locked at this height with the aid of two screws inserted in holes 12 through the two parts of the channel just above the uppermost surface of the rack. The holes 12 through the first part of the channel are drilled during manufacture. When the height of the channel has been adjusted during erection, the holes 12 are then drilled through the other part of the channel so that the channel height can be locked by screws through said holes.

A bracket 13 is used to fasten the cover 11 to the channel and for connecting the channel A to the rack 5. This bracket 13 has a bottom plate 14 and two side flaps 15 upstanding at 90° to the bottom plate (see FIG. 3). The bracket 13 is provided with a U-shaped hole 16 in the respective side flap, and when it is fitted the flaps are thrust down between the two channel parts over the screws in the screw holes 12 so that the edges of the holes 16 engage against the screws. The cover 11 is fixed against the cable channel A by the side flaps 15 being placed such that a part of them lies between the channel parts and another part lies over the cover, whereby the side flaps 15 overlap the cover 11, which is thus kept in position. The channel is connected to the rack by the bottom plate 14 being attached to the rack by screws. A like bracket also fixes the cable channel to the floor in the telephone exchange. In this case the side flaps are screwed to the cable channel and the bottom plate screwed to the floor.

We claim:

1. A cable channel for running telephone cables from a fixed horizontal cable run in a telephone exchange to telephony equipment in a shelf rack in said telephone exchange, characterized by a cable channel including a first part and a second part movable relative to said first part, such that the height of the cable channel can be adjusted to the height at which said fixed horizontal cable run is placed the cable channel being joined up to the horizontal cable run and to said rack so that the telephone cables are run from said cable run through the cable channel to the telephony equipment in the rack.

2. A cable channel as claimed in claim 1, wherein said first part has a rectangulr cross section and said second movable part has a corresponding configuration allowing it to be moved inside said first part, both parts being provided with through holes for enabling the cable channel to be locked at different heights by screws, and a cover being placed over an opening along the front long side of the channel.

3. A cable channel as claimed in claim 2, wherein a bracket, including two side flaps upstanding at an angle to a bottom plate, fix said cable channel to said rack, the side flaps being connected to the cable channel and the bottom plate to the rack.

4. A cable channel as claimed in claim 3, wherein said side flaps overlap the cover such that the cover is locked to the cable channel when the side flaps are fastened to the cable channel, each flap being provided with a U-shaped recess which connects the bracket to the cable channel when said recesses are pressed down over said screws inserted in the holes, the bottom plate being connected to the upper side of the rack with the aid of screws.

* * * * *